Oct. 17, 1967  D. R. MOWRY ET AL  3,348,005
CALIBRATABLE PRESSURE-SENSITIVE ACTUATOR
Filed June 3, 1966  3 Sheets-Sheet 1
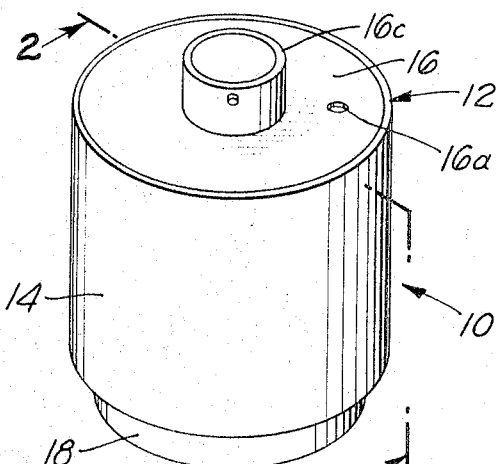
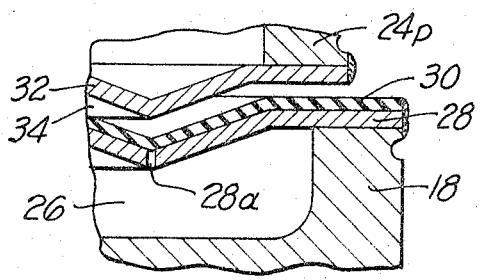
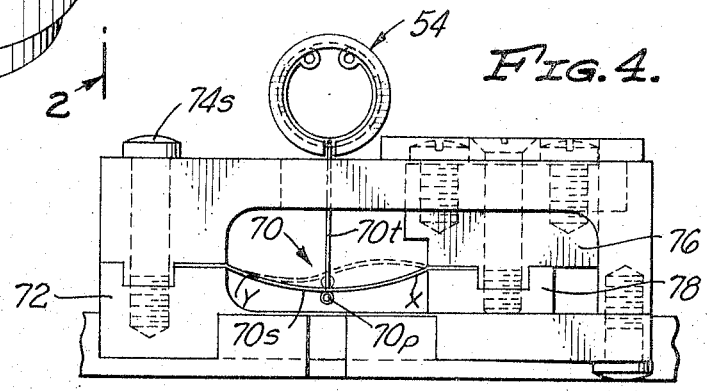
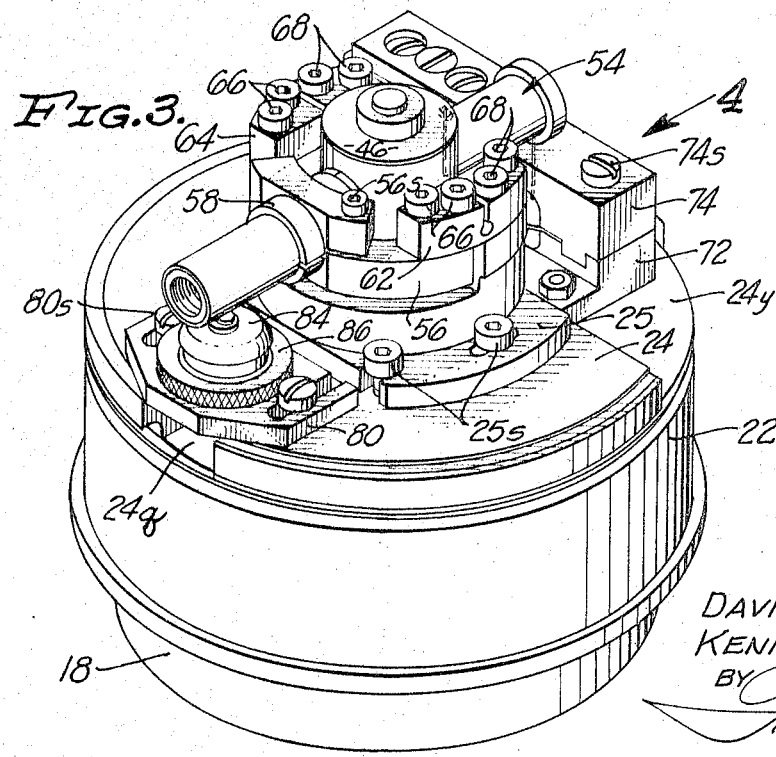
INVENTORS
DAVID R. MOWRY,
KENNETH M. CLARK
BY

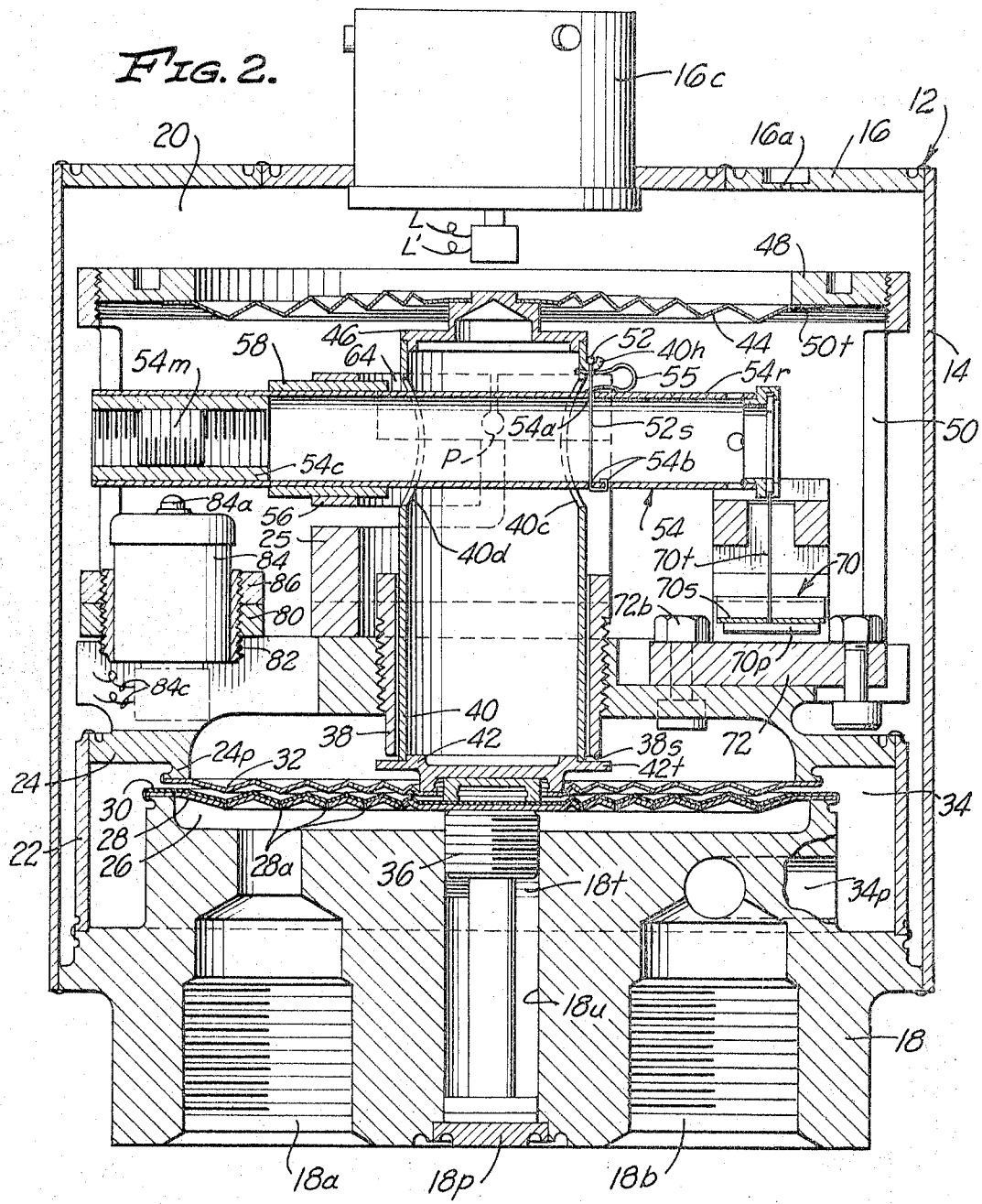

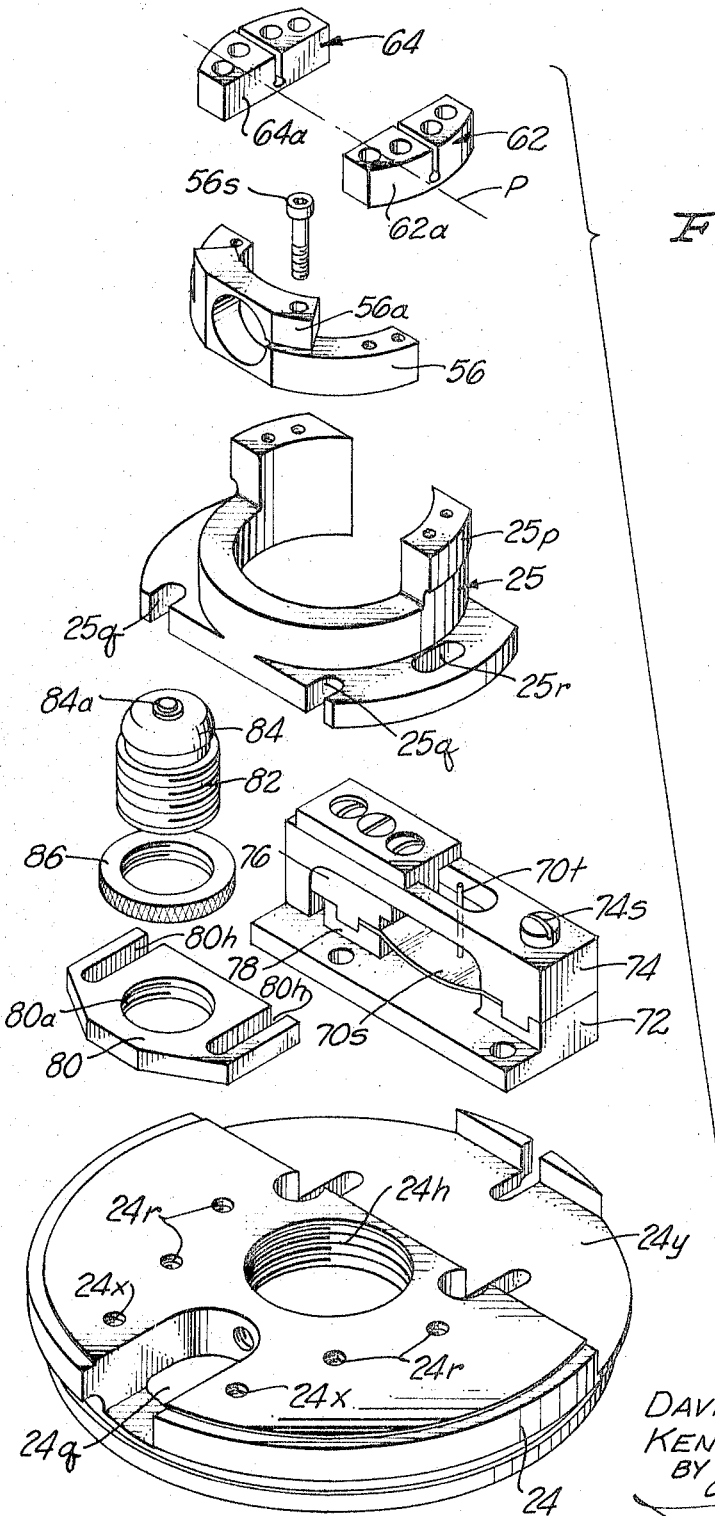

United States Patent Office 3,348,005
Patented Oct. 17, 1967

3,348,005
CALIBRATABLE PRESSURE-SENSITIVE
ACTUATOR
David R. Mowry and Kenneth M. Clark, Riverside, Calif.,
assignors to Bourns, Inc.
Filed June 3, 1966, Ser. No. 555,086
9 Claims. (Cl. 200—83)

ABSTRACT OF THE DISCLOSURE

A pressure-sensitive actuator means for rapidly actuating operable means, such as an electrical switch, incident to change of fluid pressure in a chamber from a determinable pressure to a higher or lower pressure, the actuator means comprising a pressure sensor, a snap-acting spring-stressed lever means connected to the sensor and arranged to break-down or suddenly change state incident to such change of pressure and effective to operate the operable means incident to such change of state, and including auxiliary pressure-sensitive means sensitive to a separate fluid of accurately controllable calibration pressure and effective to operate the first-mentioned pressure-sensitive actuator means to permit calibration or adjustment of the actuator means so the latter actuates the operable means at the selected calibration pressure.

---

The invention hereinafter disclosed pertains to pressure-sensitive structures adapted to rapidly move an element from active to inactive positions, or vice versa, in response to a small change of pressure exhibited in a fluid, and more specifically the invention pertains to such structures in which the mechanism is adjustable so that the magnitude of the pressure at which the triggering or rapid movement of the element will occur can be accurately selected within an extensive pressure range and such that the exact pressure at which triggering will occur may be determined, with the structure incorporated into the system in which it is to be used, immediately prior to use. As herein exemplified, the structure according to the invention is applied to actuate a movable element of an electrical switch.

Movement of the sensor device of a pressure-sensitive instrument or structure may be very slow in those situations in which variation of the sensed pressure is slow. For illustration, the variation in atmospheric pressure at a land station may be cited. On the other hand, it is in some situations desirable that an element be very rapidly moved from one position to another if, and only if, the sensed pressure exceeds (or falls below) a selected value. For example, in the case of an electrical switch, it is desirable that the contacts come together or "make," and separate or "break" as rapidly as is practicable, so that arcing is minimized. Thus in situations in which it is desired that an operable element such as a switch contact be rapidly moved in response to arrival of a very slowly moving device (such as a pressure-sensitive diaphragm) at a precisely selected position or state, there may be interposed between the element and the device a trigger mechanism or "snap-acting" means which is gradually stressed by the slowly moving device and which breaks down or changes state and position suddenly and in so doing lowers its resistance to movement and operates the element to the active state or position. Additionally, under certain circumstances it is extremely desirable to provide such a combination of devices and elements as a structure or mechanism which may be adjusted or calibrated so that it will effect rapid movement of the actuatable element whenever the pressure-sensitive means senses a particular selected pressure within a range of pressures; and so that the adjustment may readily be changed so that the triggering will occur exactly at another preselected pressure value. The present invention provides such an adjustable structure or mechanism with adjustment means whereby the triggering level may be so selected.

It is, then, a principal object of the invention to provide a pressure-responsive switch having a calibratable snap-acting mechanism that may be adjusted to change state or snap from one state to another in response to change of applied pressure to any particular selected pressure value within a range of pressure values.

Another object of the invention is to provide a pressure-sensitive mechanism of the character indicated and which is extremely rugged and quite insensitive to acceleration and vibration and which is small and compact.

Another object of the invention is to provide improvements in a calibratable pressure-responsive electric switch mechanism.

Another object of the invention is to provide improvements in means for calibrating and adjusting pressure-responsive snap-acting mechanisms.

Other objects and certain advantages of the present invention will hereinafter be stated or made evident in the appended claims and the following description of a presently preferred exemplary physical embodiment of the invention as illustrated in the accompanying drawings which form a part of this specification.

In the drawings:

FIGURE 1 is a pictorial view, on no particular scale, of an embodiment of the invention as incorporated in a snap-acting calibratable pressure-sensitive switch housed in a welded hermetic casing;

FIGURE 2 is a sectional view in elevation showing details of the device depicted in FIGURE 1, but on a larger scale and with some parts not sectioned, the section being taken as indicated at broken line 2—2 in FIGURE 1;

FIGURE 3 is a pictorial view, on an arbitrary scale, of a part of the structure depicted in section in FIGURE 2 with a diaphragm-like range spring removed and showing general relationships of parts comprised in a lever means;

FIGURE 4 is a fragmentary sectional view in elevation depicting portions only of the exemplary mechanism as viewed in the direction indicated by arrow 4 in FIGURE 3 and principally illustrating the arrangement of a snap-spring or beam and its connection to a tubular lever;

FIGURE 5 is a fragmentary sectional view, on a larger scale, of a portion of the pressure-sensing diaphragm and membrane structure shown in section in FIGURE 2; and FIGURE 6 is an exploded pictorial view of some of the principal elements of the exemplary structure depicted in FIGURES 2 and 3.

Referring first to FIGURE 1, the instrument according to the invention is indicated generally by reference number 10, and comprises structures enclosed in a generally cylindrical housing 12 formed principally by a cylindrical shell 14 and end members 16 and 18. Affixed and sealed in end member 16 is an electrical connector device 16c (FIGURE 2) wherewith sealed external electrical connections are effected in a well known manner.

As is made evident in FIGURES 2, 3 and 4, the several housing members are formed and disposed to be welded together around their respective peripheral mating surfaces, to provide a sealed upper chamber 20 (FIGURE 2) which may be evacuated via a sealing orifice 16a. Also, and as indicated, lower end member 18 serves as a support upon and by which a short cylindrical member or stand 22 is supported, the two parts being peripherally welded to provide a fluid-tight seal as well as a structural foundation. Similarly peripherally welded and sealed together are the upper end of cylindrical stand 22 and a shaped base 24 (FIGURE 2) upon which parts presently to be described are supported.

The lower end member 18 is provided with first and second fluid ports 18a and 18b, either or both of which may be threaded for reception of complementary fluid conduits (not shown) in the form of conventional hydraulic connectors or couplings. Port 18a communicates with a shallow chamber 26 that is formed between a finely perforated circular annularly corrugated back-up or support plate 28 and the upper face of member 18. Plate 28 is peripherally welded to a complementary annular face provided around the upper extremity of member 18; and chamber 26 is sealed from the region thereabove by a thin flexible circular membrane 30 (see also FIGURE 5) which is shaped to closely conform to the upper surface of back-up plate 28 and is sealed by welding to the latter member around their adjacent peripheral edges. The small perforations in plate 28, such as those indicated at 28a, permit fluid admitted to port 18a to exert pressure against the lower face of membrane 30 and force the latter upwardly into force-transmitting contact with the lower face of a resilient circular annularly-corrugated pressure-sensitive diaphragm 32. Diaphragm 32 is peripherally welded and edge sealed to a depending annular lip 24p provided on base 24. There is thus provided a substantially closed chamber 34, which comprises an annular outer portion and a thin portion extending between the lower face of diaphragm 32 and the upper face of membrane 30, into which chamber-system fluid under pressure may be admitted through port 18b and an inter-connecting passage 34p indicated as extending between port 18b and chamber 34 in FIGURE 2. The thin portion of chamber 34 is exaggerated in depth in the drawings, in the interest of clarity of illustration. The areal dimension of the effective portion of membrane 30 is slightly greater than that of diaphragm 32, whereby the added spring effect (of member 30 plus member 32) when fluid acts in chamber 26 is compensated. As is evident the areal extents can be so proportioned as to accommodate various spring rate combination.

As will be evident from consideration of FIGURE 2 and the preceding description, fluid admitted under pressure into port 18b and chamber 34 will exert pressure upwardly on the lower face of diaphragm 32 and downwardly on the upper face of membrane 30. Membrane 30 is supported against disruptive deformation by such pressure, by plate 28 which in turn is backed up by an adjustable stop or plug 36, whose thread engages the internal thread 18t provided in a bore 18u formed through member 18. The bore 18u of member 18 is sealed by a cover plate 18p welded into place in a stepped portion of the bore after the plug has been adjusted to the desired position relative to plate 28 and secured in place.

Supported by base 24 and threaded in a tapped hole 24h therein (FIGURE 6) is a cylindrical high-pressure stop member 38 which is effective to adjustably limit upward movement of diaphragm 32 and corresponding movement of the means thereto connected. Freely reciprocable in the bore of member 38 with clearance therebetween is a cylindrical force-transmitting strut 40 the lower end of which is firmly secured (as by welding) to a driving plate 42. The lower annular face of plate 42 is peripherally welded to the upper surface of diaphragm 32. Thus upward deflection of the diaphragm incident to introduction of fluid under pressure in chamber 34 tends to cause upward translation of plate 42 and strut 40. The extent of such upward movement is restricted by an annular flange portion 42t of plate 42 which is arranged to engage and be stopped by the lower annular surface 38s of member 38. Thus damaging overtravel of the diaphragm 32 is prevented.

Upward translation of strut 40 incident to application of fluid under pressure into chamber 34 is resisted by the tension in a diaphragm-like range spring 44 (FIGURE 2) the center of which is apertured and bears down on an upper accommodating portiton of a strut cap 46 to which it is eventually secured and which cap in turn is welded to the upper portion of the strut. Spring 44 alone or with an additional similar member not shown also acts as a stabilizer in preventing deflection of the strut transversely of the axis of the latter. The material of which spring 44 is made, e.g., Be-Cu alloy, is selected to provide increase in stiffness with decreasing temperature so as to compensate for change-of-temperature effects in the instrument. The materials or material combination are selected to provide compensation for the particular diaphragm material and thickness used in member 32. The outer periphery of spring 44 is secured to a ring-nut 48 whose external thread mates with an internal thread 50t provided in the upper cylindrical end of a fenestrated stand 50 that as its lower generally cylindrical end is welded to base 24. Thus, by rotation of nut 48 as by means of a spanner wrench, the tension in the spring 44 and the downward force exerted thereby on cap 46 and strut 40 may be adjusted. The pressure-range of the instrument is largely determined by the spring constant of spring 44.

Formed from a lanced portion of the upper end portion of strut 40 (FIGURE 2), or, alternatively, secured thereto as by welding, is a bifurcated hook 40h which provides a saddle or seat for the head of a draw pin 52. The draw pin has a T-head, the crossbar of which rides in the saddle with the stem 52s of the pin extending downwardly between the tines of the bifurcate hook or saddle. The stem 52s of pin 52 extends through an aperture 54a formed in a generally horizontally disposed (as illustrated) tubular snap lever 54, and continues on diametrically across the interior of the lever and is anchored, as shown, in and at a pair of other apertures 54b formed in the lever. Preferably the pin 52 is also further secured to the lever as by welding or brazing at the region between the noted other apertures. The pin is kept taut between the saddle of hook 40h and the anchorage at apertures 54b by a bifurcate hair-pin leaf spring 55 one limb of which bears against hook 40h on opposite sides of the stem of the pin and the other leg of which bears on the exterior surface of lever 54.

As indicated in FIGURE 2, lever 54 extends through large clearance apertures or windows 40c, 40d provided in strut 40, the apertures and the proportions of the parts being sufficient for, and such as to permit, rocking of the lever without contact thereof with strut 40. The lever is rigidly clamped and supported by and between a half-moon lower clamp member 56 (FIGURES 3 and 6) and a short upper clamp member 56a which as shown may be integral with members 56 and is drawn tightly toward the latter by a clamp screw 56s; there being, preferably, a split-cylinder reinforcing member 58 interposed between the lever proper and the clamping means. Terminal end portions of lower clamp member 56 are rigidly attached to the lower surfaces of the free ends of respective flexural pivot members 62 and 64 (FIGURES 3 and 6) as by means of screws such as 66, 66. The other and restrained ends of pivot members 62 and 64 are rigidly supported by and upon pedestals such as 25p, upstanding from but integral with a post 25 that is supported as shown in FIGURE 3 on base 24, and to which pedestals the pivot members are secured as by means of screws 68, 68. As indicated in FIGURE 6, post 25 is provided with slots 25q and elongate screw holes 25r for reception of screws 25s (FIGURE 3) which are received in tapped holes such as 24r provided in base 24 as shown in FIGURE 6. Those features permit accurate alignment of movable parts, and provide for transverse adjustment and rigid attachment of the flat base part of post 25 to base 24.

Thus a rigid structure comprising lever 54, reinforcing member 58, clamp 56 and the free ends 62a and 64a of flexural pivot members 62 and 64, is supported for slight friction-free pivoting action about a pivot axis P (FIGURE 6) formed by the thin resilient portions connecting the free ends to the restrained (fixed) ends of members 62 and 64. The reduced middle portions or sections of the pivot members 62 and 64 which provide resilient hinge or pivot areas are carefully formed, as indicated in FIGURE 6, by machining a transverse bore or hole, and milling in each member a slot through from the top of the member to the bore; thus leaving only a thin resilient section of material inter-connecting the block-like end portions of either of the members. Members 62 and 64 are formed of steel and heat-treated subsequent to formation, as will be evident to those skilled in the instruments arts.

Since the lever 54 has freedom of movement about the axis P of the flexural pivots provided by members 62 and 64, except for the restraint imposed by pin 52, spring 55 and other means presently described, it may be rocked about the pivot axis by upward movement of strut 40 to which it is connected by pin 52. As is made evident in FIGURE 2, upward translation of strut 40 against the downwardly-directed influence of spring 44 and other means presently described results in upward translation of pin 52, whereby the lever 54 is rotated about the axis P, the right-hand portion of the lever rocking upwardly (as viewed in that figure) and the left-hand portion moving downwardly.

The upward pull exerted on lever 54 by pin 52 is countered or resisted to a certain limit by force created in a tension-member 70t (FIGURES 2 and 4) which may be a strap but which as shown is a wire the upper end of which is secured to a part of lever 54 and the lower end of which is secured, as by welding, to a transverse rod or pin 70p which, as shown in FIGURE 2, extends transversely across and under a strip-like elongate snap-spring 70s to which it is welded. As is indicated in FIGURES 4 and 6, the middle part of the spring 70s is bowed between anchoring structures which firmly grip and fix the ends of the spring. The anchoring structures will be presently described. The three members 70t, 70s and 70p are components of a snap-action device denoted generally by ordinal 70, which device is arranged to resist upward movement of the right-hand end 54r of the rocking lever 54 until the tension in member 70t exceeds the force at which the snap spring 70s yields and changes state. When the tension in 70t exceeds that value, the free center portion of the snap spring buckles or snaps and assumes an S configuration in a rapidly-executed change of state or shape, during which change of state the tension force exerted on member 70t rapidly decreases to a lower value. The second state or configuration assumed by spring 70s is indicated approximately by dotted lines in FIGURE 4 wherein it may be noted that the part of the spring on wherein it may be noted that the part of the spring on which draw pin 70p bears has snapped upwardly. To assure uniform action of the spring, the parts are arranged so that more of the free portion of the spring is at one side of pin 70p than at the other side. Thus portion X may comprise about 48% of the free length, and portion Y about 52%. As is also made evident in FIGURE 4, end portions of the snap-spring 70s are securely held in fixed positions by the aforementioned anchoring means. The anchorages are preferably adjustable clamping means, the arrangement being such that the length of spring disposed between the opposed jaws of the clamping means is somewhat greater than the distance separating opposed faces of the jaws. The illustrated exemplary clamping means comprises a stand 72 (FIGURES 3, 4 and 6) bolted to base 24 by bolt means such as 72b as shown in FIGURE 2 and supported on a complementary surface 24y thereof (FIGURE 3), a fixed clamp member 74 secured to stand 72 as by a screw 74s, and adjustable upper and lower clamp members 76 and 78 which are secured to stand 72 and member 74 by screws as indicated in FIGURE 4.

The lever 54 (as viewed in FIGURE 2) is provided with counterweight means which in the illustrated exemplary structure includes an internally threaded sleeve 54c affixed in an end portion of the lever, and an adjustable threaded mass 54m turned into and secured in the bore of the sleeve, the arrangement being such that the movable portion of the lever system as a unit is brought into a substantially balanced condition as mass 54m is brought to the proper position in sleeve 54c.

As is made evident in FIGURES 3 and 6, there is supported and affixed on the upper face of base 24 below the free end of lever 54 an adjustable switch-support 80, by means of screws such as 80s which pass through slots 80h in the support and are turned into tapped holes such as 24x formed in base 24. Switch support 80 is provided with a tapped aperture 80a which is disposed to be positioned over an aperture and recess 24q formed in base 24 (FIGURES 3 and 6). Aperture 80a is threaded to receive an externally-threaded sleeve 82 in which is securely affixed a cylindrical snap-acting electrical switch 84. The sleeve is turned into aperture 80a, and the switch and sleeve are rigidly held in adjusted position therein by a locking ring or nut 86. The switch may be a commercially-available unit such as a Klixon® 4At2–1 subminiature switch manufactured by Metals and Controls Division of Texas Instruments, Inc., Attleboro, Mass. Preferably, the exemplary switch has the captive gas therein released if the device is to be used in cryogenic environments below the freezing point of the gas. Other switch devices may be used, as is evident to those skilled in the art. The exemplary switch 84 has an actuator 84a protruding from the active or upper end thereof, and the switch-support 80 is adjusted so that the actuator is disposed directly below the free end of lever 54, and close to but spaced from the latter.

Thus, upon the sudden breakdown or change of state of spring 70s under increasing tension in member 70t as the strut 40 tends to rise incident to increasing pressure exerted by fluid in chamber 34, lever 54 rapidly rocks slightly above pivot line P and engages actuator 84a and thereby actuates the switch 84. The rocking movement is sudden due to the breakdown of tension in member 70t; whereby the switching action occurs in a brief interval of time.

Switch 84 comprises a pair of conductors 84c (FIGURE 2) extending from the lower end thereof, which conductors are extended and connected to leads L and L' comprised in the connector in cap 16c, the extensions being arranged in chamber 20 so as to not interfere with functioning of the moving parts of the structure. For example, the conductors extending from the switch to leads L and L' are secured to appropriate areas of stand 50 and to cap 16 as by use of clips or adhesive (not shown).

Incident to decrease of the pressure exhibited in the first or primary chamber 34 to a value a determinable amount below that at which change-of-state of snap-spring 70s occurs, the latter spring again changes state in a reverse or return snap-action performance, assuming its original configuration as indicated in full lines in FIGURE 4. Thus high tension in draw wire 70t is re-established and lever means 54 is returned to the original rest (inactive) position, permitting switch 84 to return to the original status. These return movements are accomplished rapidly in a very brief interval of time. Return of lever means 54 is aided to a small extent by the spring tension created in the "spring-hinge" or pivot portion of the flexural pivots provided in members 62 and 63; however, it may be noted that in a very small switch device as herein disclosed and as presently constructed, movements of the principal moving parts are mostly in the range between a fraction of one mil and a few mils, hence the actual flexure occurring in the flexural pivots incident to rocking of the lever means is indeed of very small extent.

The preceding description of structures and characteristics of components of the device and of operations thereof make it evident that following assembly of the parts, adjustment of the tension in spring 44 to the required value to result in triggering of the snap-spring 70s at the desired sensed pressure, calibration or determination of the exact pressure value expected to be exhibited by the fluid of interest in chamber 34 incident to triggering and switch operation may be ascertained by utilizing a calibration line (tubing) and fluid connected to the calibration port 18a. To so determine the indicated triggering pressure, or calibrate the device, pressure within chamber 34 is relieved, and fluid under gradually increasing and accurately measured pressure is admitted to chamber 26 until switch operation occurs. The fluid so admitted exerts pressure on the lower face of flexible membrane 28, the upper face of which is disposed extremely close and in force-transmitting relation to the lower face of diaphragm 32, whereby the calibrating fluid pressure effectively acts in place of fluid under pressure in chamber 34 and causes actuation of the switch. As is evident, if there is any slight difference in the pressure required in fluid in chamber 34 to cause switching and the pressure required for that action by fluid in chamber 26, all other environmental factors being the same, the difference may be determined prior to installation of the device in an apparatus, and the difference taken into account during operation with the device installed.

As may be evident, the tension in draw wire 70 required to cause breakdown or change-of-state of snap-spring 70s may to a desired extent be adjusted by changing the gap or separation between the opposed faces of the clamping members, by varying the length of the free (curved) extent of spring 70s relative to the gap, and/or varying the thickness or material or width or length or otherwise changing the spring constant of the spring. The extent of upward movement of strut 40 necessary to create spring-triggering tension in wire 70t, and hence the fluid pressure required to effect triggering, is adjustable through adjustment of the position of spring 44. As is evident, the spring constant of spring 44 is susceptible of appropriate choice over a range of values by selection of material and/or thickness of the spring; and thus the device can be appropriately composed to operate within a fairly extensive one of any of many segments of a pressure spectrum or range.

It is evident from the preceding description that by making spring 44 the predominant member of the two members 32 and 34 whose tension must be overcome by the force supplied by the pressure of fluid against the diaphragm 32, the same diaphragm and related parts can be used in any of a series of instruments designed to cover respective ranges of applied pressure, by simply using different springs 44, each selected for a respective pressure range. In each case, spring 44 is adjusted to apply a certain load (here termed pre-load) on strut 40. That load is initially borne by stop member 36 in the base of the instrument, at least during increase of pressure in chamber 34 to a predetermined value (P1) somewhat lower than the pressure value (P2) at which switch-actuation is desired to occur. During increase of applied pressure from value P1 to value P2, the load applied by spring 44 is transferred from stop 36 to diaphragm 32 and to snap-spring 70s via strut 40 and members 52s, 54 and 70t. During such pressure increases even very severe vibration of the instrument cannot cause switch actuation as is the case in prior-art instruments, since the lever 54 is out of contact with switch 84 and since lever 54 is balanced. Similarly, it is evident that when the pressure value P2 is reached, the resistance of snap-spring 70s is overcome, and thereafter resistance rapidly falls to a lesser value as the snap-spring 70s buckles; and the buckling of the spring permits draw wire 52s to rapidly rock lever 54 about pivot axis P and into actuating contact with actuator 84a of switch 84. Thus the switch is quickly actuated. Further, since now there is an appreciably lower tension in member 70t, the lever 54 is positively held in switch actuating position despite possible vibration of the instrument. Overtravel of the diaphragm, spring 44, strut 40 and lever 54 following breakdown of the snap-spring is prevented by stop member 38, against which member the flange 42t comes to rest when the switch-actuating rotation of lever 54 occurs. Thus in the second state of spring 70s, with the applied pressure value equal to or greater than P2, the lever 54 is again held in a stable second position by the tension applied by member 52s, whereby in the switch-actuated state all of the active components of the operating mechanism are immune to intense vibration. Thus the stable-state condition of the operating mechanism, whether in switch-actuating (second) state, or in the initial (first) state, is in either case one in which vibration of the instrument will not cause intermittent or undesired opening and closing (chattering) of the switch. That is a distinct departure from the situation found in prior art pressure-sensitive switches.

Following actuation of the switch 84 incident to increase of applied pressure to the value P2+ΔP as described, the applied pressure must decrease to a value somewhat lower than that exhibited at switch-actuation before lever 54 is returned to normal inactive position with incident change of the switch to initial condition. Thus as the applied pressure is lowered a pressure value is reached at which flange 42f is permitted to move away from stop 38s under the restoring-force influence of spring 44 (aided to some extent by diaphragm 32 and the spring action of the flexural pivot devices 62 and 64); and when that occurs a condition is reached at which snap-spring 70s can return to its initial state. Thereupon the snap spring very rapidly returns to bowed condition, quickly applying high tension to member 52s. The lever system is such that the force applied to draw pin 70t and the end of lever 54 is multiplied and applied to the strut by way of member 52s; and thus the strut, diaphragm 32 and spring 44 are in a snap-action movement returned to their first-state positions. As lever 54 returns to neutral position, substantially all of the tension is removed from members 52s and 70t, leaving lever 54 in a balanced and neutral state; and concurrently member 42 is brought to rest on "pre-stop" member 36.

From the preceding it is evident that incident to increase of applied pressure to the predetermined value, there is an unambiguous actuation of the switch at a pressure that may be regulated by two means, first, by adjustment of spring 44 which may for convenience be termed a range spring, and, to a lesser degree, by changing the lever arm lengths of the snap beam, or lever, 54. The latter adjustment is effected by loosening clamp screw 56s on the lever, loosening screws 25s, and shifting member 25 toward or from switch 84 (moving the lever 54 in clamp 56 to accommodate the shift of the flexural pivot axis), and thereafter tightening the loosened screws.

Similarly, following actuation of the switch by the snap-lever 54 and incident to lowering the applied pressure, there is an unambiguous release of the switch actuator 84a as the snap-spring 70s returns to its first, or normal, state. While intense vibration of the instrument has no effect on the pressure-point at which the switch is first actuated, such vibration may cause deactuation (return to original state) of the switch at any of a small range of applied pressures lower than the pressure at which the switch is actuated. As will be evident, such deactuation over a small range of applied pressures is of no material consequence, as it is the certain unambiguous actuation at a precisely determinable pressure that is important in operation of the instrument.

Temperature variations similarly are of no material consequence in the precise actuation of switch 84, since by utilizing spring members suitably composed of selected alloys, and appropriate diaphragm and flexural pivot means, dimensional changes caused by temperature effects are easily compensated. And since the rocking movement of lever 54 is of the order of only one degree, hysteresis effects are of low order.

Once installed, the pressure-sensing means and lever system can be calibrated prior to final closing (welding) of the outer shell of the housing of the instrument, and thereafter, following installation of the instrument, accurate determination of the switching pressure can be made without disconnecting port 18b from the system to be monitored. Initial adjustment is effected by introducing fluid under accurately measured pressure into port 18a, and adjusting the spring and lever system to snap at the prescribed pressure. Thereafter, once the instrument is installed in an inaccessible location in an installation, a check on switch operability and on the pressure at which the system fluid will actuate the switch is readily effected by introduction of auxiliary fluid to the calibration membrane 30 by way of port 18a and chamber 26.

In the drawing diaphragm 32 is depicted as being spaced from membrane 30, for clarity of illustration. In practice, those two members are substantially in contact over a major part of their opposing faces when the instrument is relaxed (no applied pressure).

It is evident that the difference between the switch-actuating pressure, Pa, and the pressure, Pd, at which the mechanism permits return of the switch to original state, is to some extent adjustable by varying the relative positions of stop members 36 and 38.

The preceding description of the construction and operation of the components of the device and of the device as a whole makes it evident that there is provided means, including fixed means such as parts numbered 14, 16, 18, 22, 24 and 50, which provide or form a housing that surrounds an enclosed region or space that is divided into first and second chambers 34 and 20 by a second means including a resilient diaphragm 32 which may resiliently yield and deform in response to admission of fluid under increasing pressure in chamber 34. Also, that a third means, including a lever means 54 and a strut 40, is provided and arranged to tend to respond to deformation of diaphragm 32 by rocking of the lever means, the rocking movement when of effective extent being such as to cause actuation of a switch means by the lever means and the rocking movement being resisted by fourth means which comprise a snap-acting means or spring 70s which in a first state strongly resists rocking of the lever means but which under action of a determined force corresponding to a determined pressure acting on the diaphragm, snaps to a second positional and lower-force-resisting state and concurrently permits the lever means to rock to effect actuation of a switch 84 comprised in the switch means. Also, that subsequent to such effective rocking of the lever and concurrent actuation of the switch, reduction of pressure in the first chamber to a value below that at which triggering (breakdown, or change from first to second state) of the snap-acting spring occurred, the latter snaps back from the second state to the first state, causing release by the lever means of the switch means whereby the latter also changes condition. It may be understood that the lever means may rock very slightly during increase of tension in the draw-wire 70t to the value required to cause change of state of springs 70s, but the effective switch-actuating rocking of the lever means is that which occurs as a result of the snap-spring giving-away and changing state.

Also the preceding description makes it evident that the aforementioned objects of the invention have been attained. In the light of the disclosure, changes within the true scope and spirit of the invention will occur to others and hence it is not desired that the scope be restricted to exact details of the exemplary structure except as may be required by the appended claims.

We claim:

1. A pressure-sensitive electrical switch device capable of very rapid operational movements including switch opening and closing operations in response to increase in pressure above a determinable value and decrease below such value, exhibited by a fluid under pressure admitted to the device, said device being capable of such operation despite extremely slow approach of the exhibited pressure to said value, said device being adjustable so as to operate to perform the switching operation at any selected pressure in a wide range of pressures, said device comprising:

first means, including fixed means, arranged to provide a housing surrounding an enclosed space divisible into first and second chambers and said first means providing for admission of a first fluid under pressure into a first such chamber;

second means, including resilient diaphragm means in said enclosed space, said second means being secured to said first means and effective to divide said enclosed space into first and second chambers each sealed thereby from the other, said diaphragm means being susceptible of elastic deformation under the influence of pressure difference exhibited by fluids acting upon opposite faces of said diaphragm;

third means, including lever means comprising a lever mounted for rocking movement in said enclosed space and having connections to said diaphragm means, whereby tendency of said diaphragm means to deform in response to change of pressure exhibited by fluid in said first chamber results in tendency of said lever to rock;

fourth means, including snap-acting means, connected to said fixed means and to said lever means and effective to resist the tendency of said lever means to rock and to prevent effective rocking of the lever means until a certain value of pressure is exhibited in said first chamber and to then suddenly change state and yield and thereby permit said lever means to rapidly rock; and fifth means, including electric switch means supported by said first means and disposed to be actuated by said lever means incident to effective rocking of said lever means upon yielding and change of state of said snap-acting means.

2. A device according to claim 1,
said second means comprising a flexible membrane having a first face in said first chamber and disposed in very close face-to-face relationship to said diaphragm means, and said first means having provision for admitting a second fluid under pressure to the second face of said membrane to force said second face into force-transmitting contact with said diaphragm, whereby by admitting such second fluid under carefully measured pressure to said second face of said membrane the pressure at which a said first fluid under pressure admitted to said first chamber would cause actuation of said switch means may be determined without admission of a first fluid under pressure to said first chamber.

3. A device according to claim 1,
said third means including adjustable spring means arranged to tend to change resistance to movement of said connections during increase of pressure exhibited by a fluid admitted to said first chamber, whereby by adjustment of said adjustable spring means the pressure in said chamber at which switch means actuation occurs may be adjusted over a wide range of pressures.

4. A device according to claim 1,
said third means comprising flexural pivot means supported by said first means and supporting said lever means, and said connections comprising a strut secured to said diaphragm means to move therewith incident to deformation of the latter by pressure of fluid applied thereto, and a tension member connecting said strut to said lever for stressing the lever means to rock in response to movement of said strut caused by deformation of said diaphragm incident to increase of pressure in said first chamber.

5. A device according to claim 1, said third means comprising first and second flexural pivot members each having a fixed portion affixed to a portion of said fixed means and each having a movable portion connected to said lever means, each of said pivot members having a portion intermediate the respective ends thereof formed as a thin resilient portion adapted to elastically bend to permit rocking movement of said lever.

6. A calibratable pressure-sensitive device for effecting very rapid movement of a member from a first positional state to a second positional state in response increase to a preselected value of the pressure exhibited by a fluid admitted to the device, such movement being rapid irrespective of whether the increase of pressure exhibited by the fluid is rapid, slow or extremely slow, said device comprising:

first means, including fixed structural means, shaped to enclose a space;

second means, including a resilient diaphragm, secured to said first means and said diaphragm extending across a portion of said space whereby to divide the space into first and second chambers, said first means being formed to provide for admission of a first fluid under pressure into said first chamber and whereby such first fluid tends to deform and move a portion of said diaphragm in a first direction;

third means, including yieldable means, connected to said diaphragm and comprising snap-acting means, effective to resist movement of said portion of said diaphragm in said first direction during increase of pressure exhibited by said first fluid in said first chamber until the pressure therein reaches said preselected value and effective then in a snap action to very rapidly effect a change of positional state from a first such state to a second state; and fourth means, comprising a very flexible membrane substantially coextensive with the portion of said diaphragm exposed in said first chamber and disposed in very close face-to-face relation thereto, said first means having provision for admission of a second fluid under pressure to a region in which such fluid forces said membrane into face-to-face contact with said diaphragm to thereby tend to move said portion of said diaphragm in said first direction, whereby in the absence of fluid under pressure in said first chamber continued admission of fluid under measured increasing pressure into said region will move said membrane and said portion of said diaphragm and at said determinable value will cause rapid change of positional state of said snap-acting means, whereby the said preselected value is determined by measurement of said increasing pressure at the moment of change of state of said snap-acting means.

7. A pressure-sensitive snap-acting mechanism adapted to actuate an operable device such as an electric switch, said mechanism comprising:

first means, including means defining a substantially closed chamber and means for admitting fluid under pressure to the chamber and said chamber-defining means including resilient diaphragm means forming at least a portion of the wall of the chamber and said diaphragm means having a central portion movable in the direction of and about an axis of movement incident to change of pressure exhibited in said chamber;

second means, including integral rigid reciprocable means substantially coaxial with said axis and connected to said diaphragm to move with the central portion thereof, said second means comprising diaphragm-like spring means affixed to said reciprocable means and arranged generally transverse to said axis and arranged to exert compressive force on said rigid reciprocable means;

third means, including elongate lever means disposed along a lever axis transverse to said axis of movement and having a pivot axis and means to support the lever means for rocking movement about the pivot axis;

fourth means, including means positively connecting said rigid reciprocable means to said lever means at a location away from said pivot axis whereby to translate axial movement of said rigid reciprocable means to rocking movement of said lever means;

fifth means, including snap-acting spring means, connected to said lever means at a location away from said pivot axis and effective to restrain rocking motion of said lever means until a determined value of force is applied thereto by said lever means and responsive to application of such determined value of force to cause breakdown of said snap-acting spring means and permit rapid rocking movement of said lever means; and sixth means, including switch operating means arranged to be actuated by said lever means incident to breakdown of said snap-acting spring means and rocking of said lever means.

8. A mechanism according to claim 7, including a first stop means against which said diaphragm means is held by said rigid reciprocable means under force applied by said diaphragm-like spring means until force exerted on said diaphragm means by fluid admitted under pressure to said chamber overcomes opposing force including said force applied by said diaphragm-like spring means; and including a second stop means effective to limit displacement of said reciprocable means under the action of said fluid on said diaphragm means.

9. A mechanism according to claim 7, including a diaphragm-like membrane arranged with a first face thereof in face-to-face relationship with said diaphragm means, and means for admitting fluid under measurable pressure to the second face of said membrane to initiate rapid rocking movement of said lever means, whereby to permit measurement of the pressure required in fluid admitted to said chamber to cause initiation of breakdown of said snap-acting spring means and rapid rocking movement of said lever means.

References Cited

UNITED STATES PATENTS 2,719,889    10/1955    Miller _____ 200—81.9
3,208,264    9/1965    Melton _____ 73—4

BERNARD A. GILHEANY, *Primary Examiner.*

H. BROOME, *Assistant Examiner.*